F. J. KUHLEMEIER AND R. J. QUELLE.
ROASTER.
APPLICATION FILED JUNE 6, 1918. RENEWED OCT. 13, 1920.
1,377,591.
Patented May 10, 1921.
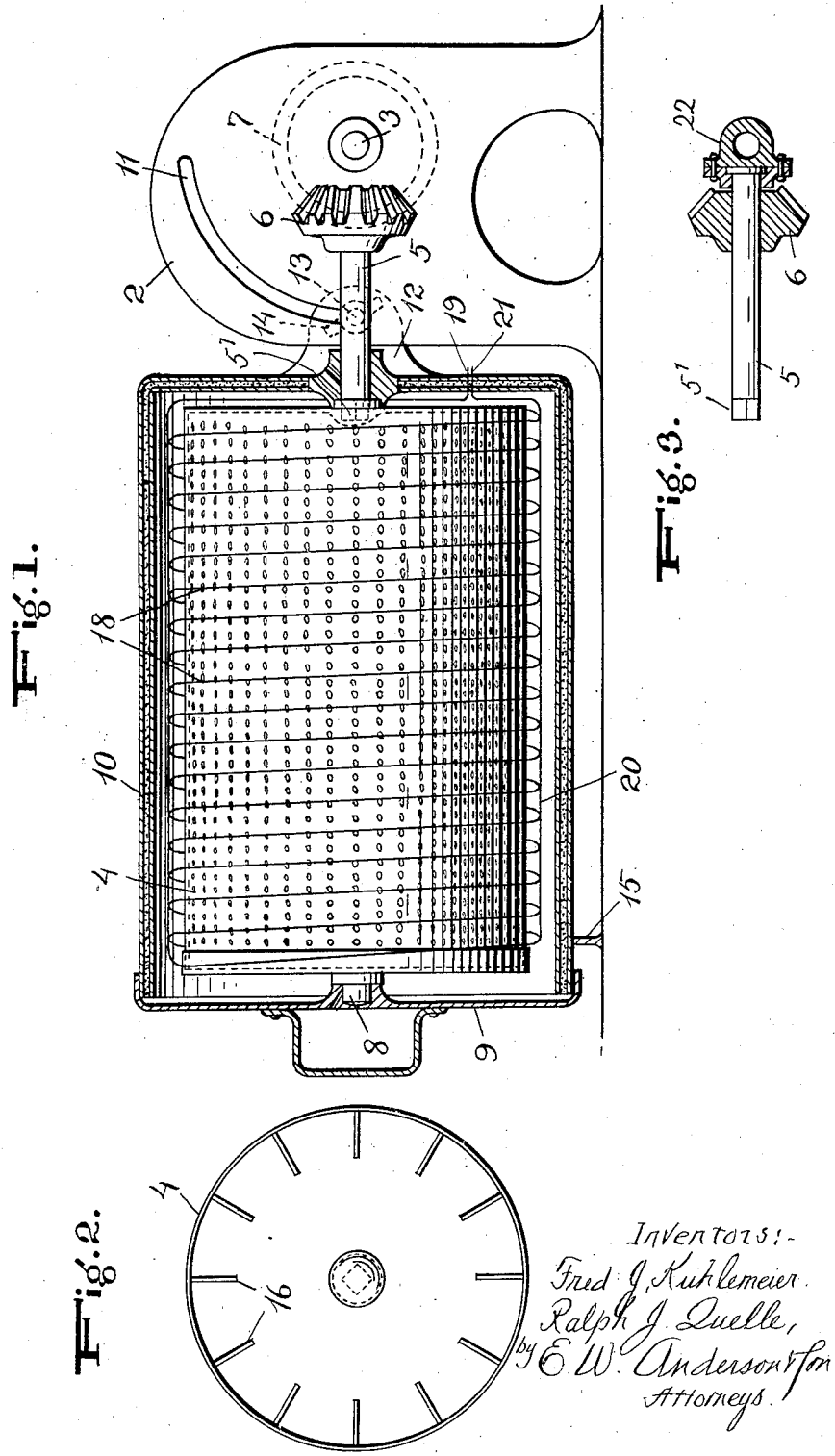

UNITED STATES PATENT OFFICE.

FRED J. KUHLEMEIER AND RALPH J. QUELLE, OF BURLINGTON, IOWA; SAID QUELLE ASSIGNOR TO SAID KUHLEMEIER.

ROASTER.

1,377,591.  Specification of Letters Patent.  Patented May 10, 1921.

Application filed June 6, 1918, Serial No. 238,530. Renewed October 13, 1920. Serial No. 416,779.

*To all whom it may concern:*

Be it known that we, FRED J. KUHLEMEIER and RALPH J. QUELLE, citizens of the United States, residents of Burlington, in the county of Des Moines and State of Iowa, have made a certain new and useful Invention in Roasters; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention, partly in section.

Fig. 2 is a detail end view of the container with cover removed.

Fig. 3 is a detail view partly in section showing the oven shaft provided with a pivotal bearing upon the drive shaft.

The invention has relation to roasting ovens for coffee, popcorn, peanuts, cereals, and also useful in drying fruits, toasting bread, baking potatoes, etc., the object being to provide an improved rotatable oven.

The invention consists in the novel construction and combinations of parts, as hereinafter set forth.

In the accompanying drawings illustrating the invention, the numeral 2 designates an upright standard or support, having a shaft 3 journaled therein, said shaft having driving connection with an electric motor or other suitable source of power.

4 is the oven, preferably of hollow cylindrical or drum form, the inner end plate of which has a central axle extension 5, provided at one end with a bevel gear wheel 6, driven from a bevel gear 7, upon the shaft 3.

The inner end of the oven has a central stud or spindle extension 8, rotatable in a bearing of the cover 9, of an outer cylinder or non-conducting casing 10, the shaft or axle extension 5, rotating in a bearing of the inner end of said casing.

The standard is provided with an arcuate slot 11, concentric with the shaft 3, and the inner end of the outer cylinder or casing is provided with an extension 12, a clamp bolt 13, engaging said slot and said extension and being provided with a thumb nut 14 to clamp the extension and standard rigidly together.

Normally the outer cylinder or casing and the inner cylinder or container 4, rotatable therein, will be supported in horizontal position, a prop or supporting member 15 engaging the bottom of the outer end portion of the non-rotatable casing.

The inner cylinder or container is provided with perforations in its peripheral wall, and said wall has extending inwardly therefrom a plurality of radial ribs or fins 16, the latter serving in the rotation of the container to agitate or stir the contents thereof, thereby distributing the heat furnished by means to be described, and preventing burning of said contents. In other words the material being treated will be evenly dried or cooked without becoming overdone.

The heating means for the oven or container is preferably furnished by a heating wire or element 18 wound around and spaced apart from the outer peripheral surface of the container, between said surface and the inner surface of the outer cylinder, this being a resistance wire heated to the proper degree by passage of an electric current therethrough. Usually the resistance wire will enter from the inner end of the outer cylinder at 19, being wound around the inner cylinder or container as stated and passing back again at 20, and out adjacent to its entrance at 21.

In the loading of the oven or container the clamp connection between standard and outer cylinder being loosened by adjustment of the thumb nut, the inner and outer cylinders are raised to vertical or upstanding position upon the shaft 3 as a center, the bevel gears of the drive remaining in mesh, and the thumb nut being tightened to secure the adjustment. The covers of the inner and outer cylinders being then removed, the inner cylinder can be loaded and both cylinders restored to horizontal or normal position, said covers being of course duly replaced.

The shaft or axle extension 5 of the container or oven is preferably formed with a squared or prismatic end 5' with which a squared seat of the inner end of the container has removable engagement, whereby in loading the container may be removed if desired.

In Fig. 3 of the drawing, the shaft 5 is shown as provided with an extension having rotatable engagement with a clip 22, pivotally engaging the shaft 3, to give support and guidance in the adjustment of the oven to vertical position.

We claim:—

1. In a roaster, a standard, a non-rotatable casing, a rotatable oven in said casing, the latter having pivotal connection with said standard and adjustable upon said connection with the oven to upstanding loading position and to normal horizontal position, the oven having perforated side walls, and heating means located between the oven and the casing.

2. In a roaster, a standard, a non-rotatable casing, a rotatable oven in said casing, the latter having pivotal connection with said standard and adjustable upon said connection with the oven to upstanding loading position and to normal horizontal position the oven having perforated side walls, and electric heating means including a resistance wire coiled around the oven between the same and the casing.

3. In a roaster, a standard having an arcuate slot, a drive shaft having a journal bearing in said standard, a non-rotatable casing, a rotatable oven in said casing having at one end a shaft extension having a bearing in one end of said casing and provided at one end with a bevel gear in mesh with a bevel gear upon the drive shaft, said casing having an end extension provided with a clamp bolt engaging said slot and a nut adjustable upon said bolt to secure casing and standard rigidly together, the other end of the oven having a stud rotatably engaging a seat in the other end of the casing, and the latter with the oven adjustable to upstanding loading position and to normal horizontal position.

In testimony whereof we affix our signatures in presence of witnesses.

FRED J. KUHLEMEIER.
RALPH J. QUELLE.

Witnesses to Fred J. Kuhlemeier:
  B. G. McPEAK,
  R. L. McCARTHY,
Witnesses to Ralph J. Quelle:
  H. F. KUHLEMEIER,
  ETHEL ANDERSON.